United States Patent [19]

Wang et al.

[11] Patent Number: 4,792,441
[45] Date of Patent: Dec. 20, 1988

[54] AMMONIA SYNTHESIS

[75] Inventors: Shoou-I Wang; Nitin M. Patel, both of Allentown; Shivaji Sircar, Wescosville, all of Pa.; Rodney J. Allam, Guildford, England

[73] Assignee: Air Products and Chemicals, Inc., Allentown, Pa.

[21] Appl. No.: 145,782

[22] Filed: Jan. 19, 1988

[51] Int. Cl.⁴ .............................................. C01C 1/04
[52] U.S. Cl. .................................. 423/359; 252/373; 252/376
[58] Field of Search ................ 252/373, 376; 423/359, 423/360, 361

[56] References Cited

U.S. PATENT DOCUMENTS

| | | | |
|---|---|---|---|
| 3,278,452 | 11/1966 | Vorum | 252/376 |
| 4,079,017 | 3/1978 | Crawford et al. | 252/373 |
| 4,171,206 | 11/1979 | Sircar | 55/26 |
| 4,269,588 | 5/1981 | Nogai | 425/545 |
| 4,337,170 | 6/1982 | Fuderer | 252/373 |
| 4,367,206 | 1/1983 | Pinto | 423/359 |
| 4,376,758 | 3/1983 | Pagani et al. | 423/359 |
| 4,414,191 | 11/1983 | Fuderer | 423/359 |
| 4,462,020 | 7/1984 | May | 338/25 |
| 4,479,925 | 10/1984 | Shires et al. | 423/359 |
| 4,553,981 | 11/1985 | Fuderer | 423/359 |
| 4,624,841 | 11/1986 | Hidakl | 423/359 |
| 4,671,893 | 6/1987 | Pinto | 252/376 |
| 4,681,745 | 7/1987 | Pinto | 423/359 |
| 4,695,442 | 9/1987 | Pinto et al. | 423/359 |
| 4,725,380 | 2/1988 | Pinto | 252/376 |
| 4,725,381 | 2/1988 | Pinto | 252/376 |

FOREIGN PATENT DOCUMENTS 0157480 2/1985 European Pat. Off. .

OTHER PUBLICATIONS

UK Patent Appln. GB 2179366A–published Mar. 4, 1987.

Primary Examiner—John Doll
Assistant Examiner—Wayne A. Langel
Attorney, Agent, or Firm—Geoffrey L. Chase; William F. Marsh; James C. Simmons

[57] ABSTRACT

An ammonia synthesis gas mixture comprised of substantially pure hydrogen and nitrogen in approximately 3/1 molar ratio is obtained form two stage reforming of a methane-rich hydrocarbon charge such as natural gas. About 40% of the fresh natural gas is charged to primary steam reforming and the obtained primary reformate product, containing about 17 volume percent of unreacted methane, is mixed with the other 60% of the fresh natural gas and the mixture is subjected to oxidative reforming with enriched air containing 30 to 35 of $O_2$, said enriched air being supplied in an amount to produce a secondary reformate containing principally hydrogen and nitrogen, accompanied by a minor amount of oxides of carbon (CO and $CO_2$). The secondary reformate subjected to shift reaction with steam results in conversion of contained CO to $CO_2$, thereby releasing hydrogen in an amount which together with the hydrogen previously present in said reformate obtains a $H_2/N_2$ molar ratio of about 3/1. Carbon dioxide is removed and recovered from the shift reaction product by pressure swing adsorption in a first adsorbent bed. The other contaminants remaining are largely removed by further adsorption in second adsorbent bed in flow-communication with the first bed, the unadsorbed effluent being a syngas mixture consisting essentially of hydrogen and nitrogen in stoichiometric ratio for production of $NH_3$.

14 Claims, 2 Drawing Sheets

AMMONIA SYNTHESIS

TECHNICAL FIELD

The present invention relates to ammonia manufacture and is particularly directed to improvements in the production of the synthesis gas components. nitrogen and hydrogen. by two stage reforming of normally gaseous hydrocarbons, such as natural gas or other gas mixtures rich in methane, whereby higher efficiency in operation is attained with significant savings in capital investment and operating costs.

BACKGROUND OF THE INVENTION

In the commercial production of ammonia synteesis gas the common practice is to subject natural gas or other gaseous hydrocarbon mixture) to two stage reforming, employing steam as a reactant in the first or primary stage and air or oxygen in the secondary stage. In accordance with one of the known methods, the primary reforming operation is carried out under conditions such that the primary steam reformate contains a mnor quantity of unconverted methane usually in the order of around 10%) which is reacted in the secondary reformer using an amount of air to furnish nitrogen in about stoichiometric proportion for production of $NH_3$. In another known process the primary reforming operation is carried out under conditions such that a much higher amount of unconverted methane is left in the primary reformate (in order of about 16 to 22%) which contained methane is converted in the secondary reformer using significantly large amounts of air, which amounts generally exceed stoichiometric nitrogen requirements for $NH_3$ production.

In each of these known commercial processes the raw ammonia syngas obtained is further processed by water gas shift reaction for conversion of carbon monoxide to the dioxide, followed by removal of carbon dioxide thus formed by extraction with monoethanolamine (MEA). alkaii carbonate or other physical absorbent solution. Residual carbon oxides. which are poisons to the ammonia synthesis catalysts are converted to methane via conventional methanation.

The synthesis gas thus obtained, which is introduced into the ammonia synthesis loop, is relatively free of CO and $CO_2$ but contains small amounts of impurities such as methane and argon. While the contained impurities are inerts in the ammonia synthesis process, they must be purged to eliminate their buildup in the synthesis loop.

In the above first described process a large primary reformer is needed and adequate provision for convection waste heat recovery. In the second described process a larger secondary reformer is required plus a larger size air compressor, in addition to means for purging surplus nitrogen from the ammonia synthesis recycle loop to obtain the desired $H_2:N_2$ stoichiometric ratio. Thus. each of the current processes for production of ammonia syngas has its drawbacks. In addition to the capital and operating costs incurred as a result of increased size of the primary and/or secondary reformers and for convection waste heat recovery. there are also increased energy losses through the walls and stack of the reformers. The extent of conversion of syngas to ammonia depends upon the partial pressure of the reactants nitrogen and hydrogen. The required purging of accumulating inerts is accompanied by a loss of valuable reactants. Also. because of the buildup of inerts a larger recycle stream must be used, which necessitates greater recompression and a larger sized synthesis reactor and loop.

In addition to the foregoing drawbacks, the absorption method presently employed in the removal of $CO_2$ from the reformate is energy intensive and adds significantly to the costs of ammonia production.

Various approaches have been proposed for overcoming the drawback above described. One such proposed approach is to treat the purge stream from the ammonia synthesis loop to recover hydrogen therefrom, which can be recycled to the synthesis gas being charged to the ammonia conversion operation. This approach solves only that part of the problem concerning reactant loss in the purge gas. The known separation and recovery of the hydrogen from the recycle may be effected by use of semi-permeable membrane, cryogenic fractional distillation or selective pressure swing adsorption (PSA).

A second approach proposed and offered commercially. is based upon separate production of pure hydrogen, to which pure nitrogen is subsequently added to provide the required 3:1 $H_2/N_2$ ratio.

PRIOR ART

U.S. Pat. No. 3,278,452 describes the production of ammonia synthesis gas by multi-stage conversion of a hydrocarbon vapor stream, such as natural gas. The hydrocarbon stream is split into approximately equal portions, one portion is subjected to primary reforming by reaction with added steam. The other portion is mixed with the partially reformed produt of the primary steam reforming step and the combined streams are subjected to secondary reforming by reaction with oxygen-enriched air, thereby obtaining an ammonia synthesis gas product containing sufficient nitrogen to provide, after shift conversion of contained carbon monoxide hydrogen:nitrogen ratio of about 3:1. The shift-converted product is subjected to an acid gas removal process particulars of which are not disclosed.

U.S. Pat. No. 4,269,588 discloses a process for production of ammonia by the steps of primary catalytic reforming of a hydrocarbon feed stock with steam, subjecting the obtained primary steam reformate, containing at lest 10% unreacted methane, to secondary reforming with air in amounts providing nitrogen in excess of that needed for 1:3 $N_2/H_2$ ratio. The patent states that more steam may be added to the secondary reforming step or further hydrocarbon feedstock added if desired to minimize total stream requirements. The product from the secondary reformeriis subjected to shift reaction with steam for conversion of contained CO to $CO_2$. Carbon dioxide is removed from the shift product by a liquid absorbent; residual carbon oxides may be converted by methanation. The resulting gas stream is further compressed generally to a pressure of 120 to 400 bars absolute for introduction into the ammonia conversion operation. Excess nitrogen and contained inert impurities are removed by withdrawing a side stream from the recycle loop, from which hydrogen may be recovered and recycled to the ammonia convertor.

In U.S. Pat. Nos. 4,337.170 and 4,462,020 processes for catalytic steam reforming of hydrocarbons to produce a hydrogen-rich product gas are disclosed. These processes utilize a primary steam reformer and a reformer heat exchanger. The major portion of the hydrocarbon feed is charged with steam directly to the first primary reformer and the remaining minor portion of the hydrocarbon feed s charged with added steam directly to the exchange reformer. The hot reformed effluent from the first primary reforming zone is sent to tee reformer-exchanger wherein the heat content of tha introduced effluent is utilized. In an alternative optional embodiment described. the effluent from the primary steam reforming may be subjected to secondary reforming with air or oxygen before its introduction into the reformer exchanger, air being employed instead of oxygen when ammonia synthesis gas is to be produced instead of pure hydrogen.

U.S. Pat. No. 4,367,206 discloses a method for producing methanol and ammonia. Oxygen-enriched air is employed in the secondary reforming operation. The oxygen to nitrogen ratio in the enriched air feed is controlled so as to obtain optimum production of either methanol or ammonia, as desired.

In the ammonia synthesis process disclosed in U.S. Pat. No. 4,376,758 the conventional sequence is employed including primary steam reforming and secondary air reforming of the hydrocarbon charge, shift conversion of CO in the secondary reformate to $CO_2$ followed by $CO_2$ removal and methanation of residual carbon oxides. In the modification advocated in the patent a part of the starting hydrocarbon charge is mixed with steam and directly subjected to "tertiary reforming" in which the required heat is provided by the gaseous reaction effluent from the secondary air reforming step. The obtained synthesis gas mixture is dried before introduction into the ammonia conversion system. Hydrogen is recovered by subjecting part of the gas from the ammonia recycle loop to cryogenic fractionation. the thus separated inerts being sent to fuel.

In U.S. Pat. No. 4,479,925 ammonia synthesis gas having excess nitrogen is produced in a reactor-exchanger primary reformer followed by an autothermal secondary reformer. A part of the total fresh hydrocarbon feed is directly introduced into the secondary reformer, the allocation between the primary and secondary being in the ratio of 1:1 to 3:1 with the preference being approximately twice as much fresh feed going to the primary reformer as that sent to the secondary reformer. The quantity of air introduced results in a secondary reformate containing an amount of nitrogen in excess of the desired 3:1 $H_2/N_2$ mol ratio. All or part of the excess nitrogen may be removed by pressure swing adsorption (no particulars being described), but preferably such removal is effected in a purge stream withdrawn from the ammonia synthesis loop. employing a semi-permeable membrane or a cryogenic process. The inerts thus separated from the recovered hydrogen which is recycled, including nitrogen, argon and methane, are sent to use as fuel.

According to a process disclosed in published European patent application, Publication No. 0 157 480, a raw gas comprised of hydrogen, $CO_2$ and at least one medium boiling point gas from the class consisting of CO, $CH_4$, and Ar and further containing nitrogen in excess of that required in ammonia synthesis gas, is subjected to a described selective pressure swing adsorption treatment. The raw gas fed to the adsorbent is one having a molar ratio of $H_2$ to medium boiling point (MB) gases in the range of 1.25 to 2.5. and in which at least 90% by volume, preferably at lest 95%, of the medium boiling point gases is nitrogen. Among the sources for the described mixed gas composition subjected to separation by PSA is that obtained by successive steam and air reforming of a volatile hydrocarbon feedstock. Enriched air containing up to 35% by volume $O_2$, or $O_2$-depleted air containing down to 15% by volume $O_2$ may be employed in the secondary reforming operation. The publication states that under the special conditions employed in the PSA operation the recovered ammonia synthesis gas is very pure so that purging of the ammonia recycle loop may not be required for removal of non-reactant otherwise accumulated in the recycle loop.

In accordance with the process described in U.S. Pat. No. 4,414.191 nitrogen from an air separation plant is employed at elevated pressure to purge the adsorbent bed of a PSA column employed in hydrogen purification, thus providing a recovered ammonia synthesis gas at desirable high pressure.

U.S. Pat. No. 4,171,206 assigned to applicants' assignee, discloses operation of an integrated PSA system for separation of multicomponent gas mixtures, for example, the gas mixture obtained by shift conversion of the effluent gas from a hydrocarbon reformer plant. By the methods therein described hydrogen and carbon dioxide are separately recovered as key components substantially freed of minor dilute components such as methane. carbon monoxide and nitrogen.

U.K. Patent Application No. 2179366A (published 4 March 1987) discloses two stage reforming of a hydrocarbon-containing feed for production of methanol synthesis gas (CO+$H_2$). The initial fresh feed to the primary reformer comprises hydrocarbon, $CO_2$ and steam. the partially reformed primary effluent is sent to the secondary reformer together with fresh hydrocarbon. $CO_2$, stream and oxygen-containing gas, the second reformate being passed through the primary reforming zone in indirect heat exchange. The fresh hydrocarbon feed is split so that 5–70% goes to the secondary reforming operation.

SUMMARY OF THE INVENTION

By the present invention an integrated process is presented for more efficient and less costly production of ammonia synthesis gas. In the improved process according to the invention the total raw hydrocarbon charge subjected to reforming is split, with a smaller portion being introduced into the primary steam reforming operation and a larger portion being charged directly to the secondary reformer, wherein together with the unconverted methane in the effluent from the primary reforming, it is reacted with oxygen-enriched air of controlled composition. The quantity of unreacted methane from the primary reformer introduced into the secondary reformer is balanced with the quantity of air introduced to ultimately result (after shift conversion) in a product having approximately the desired stoichiometric mixture (3:1 $H_2/N_2$). The secondary reformate, after being treated by shift reaction for conversion of contained CO to $CO_2$ is subjected to pressure swing adsorption wherein contained $CO_2$ is selectively removed. followed by further purification of the unsorbed hydrogen/nitrogen stream to remove contained contaminants by selective adsorption and recovery of a raw ammonia synthesis gas comprised of hydrogen and nitrogen in approximately 3:1 molar ratio.

The operation of the invention will be understood and certain of the resulting advantages thereof appreciated from the detailed description which follows read in connection with the accompanying drawings.

DETAILED DESCRIPTION

Figure 1:
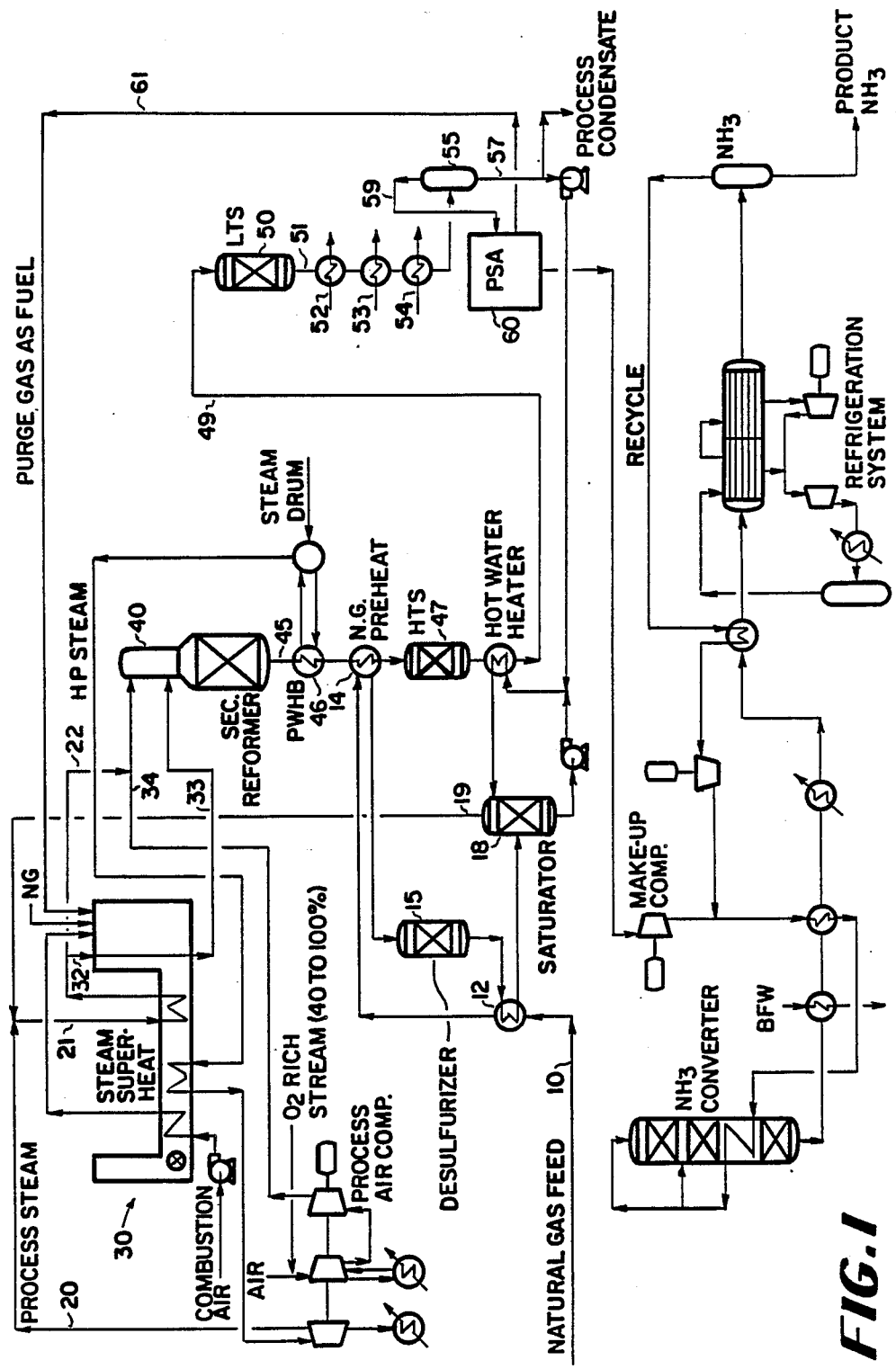
FIG. 1 of the accompanying drawings is a schematic flow diagram of a preferred embodiment of the invention.

As illustrated in FIG. 1, natural gas feed (NG) or other hydrocarbon gas mixture rich in methane is passed by line 10 through several stages of heat exchange, as shown at 12 and 14, then desulfurized (as indicated at 15) and saturated with water introduced through saturator 18. The water-laden gas stream overhead leaves saturator 18 via line 19 and is mixed with process steam introduced through line 20. The mixture is further heated by being passed by line 21 through the convection section of reforming furnace 30. A portion of the thus preheated charge then is introduced via line 32 into the radiantly heated section of furnace 30 and is discharged therefrom via line 33, by which it is introduced into secondary reformer 40. The remainder of the gas from line 21 that is not passed into furnace 30 via line 32 goes directly to reformer 40 via line 22.

To obtain optimum efficiency in practice of the invention the split between the portion of the gas from line 21 that is subjected to primary steam reforming in furnace 30 is less than that going directly to oxidative reforming in reformer 40. Thus, at least about 55% and up to about 65% of the gas from line 21 by-passes furnace 30 and goes directly to reformer 40 via line 22., the preferred split being about 40% by volume of containing hydrocarbon going to the primary furnace 30 and the remaining 60% going directly to reformer 40, under which conditions optimum efficiency is obtained using oxygen enriched air comprising 30 to 35% $O_2$ in the secondary reformer.

The primary steam reforming in furnace 30 is carried out at conditions such that the primary reformate discharged through line 33 will contain a relatively high quantity of unconverted methane subjected to conversion in reformer 40. in the order about 15 to 18 mol percent, dry basis. By permitting this relatively large amount of unconverted effluent in the primary reformate discharged from furnace 30, fuel requirements are minmized and the required size of the primary reformer furnace is reduced as well as the requirements for convection heat recovery. Otherwise the type of furnace may be that conventionally employed in steam reforming of hydrocarbons. having catalyst-containing tubes through which the introduced hydrocarbon feed is passed, the tubes being heated indirectly by fuel combustion outside of the tube walls.

The conditions for operation of the steam reforming step in practice of the invention include temperatures in the range of 1350° to 1750° F., pressure in the range of 350 to 450 psig and a steam to hydrocarbon ratio (S/C) of 3.0. Any of the known steam reforming catalysts may be used to pack the furnace tubes. such as alumina-supported nickel. Preferred conditions for primary reforming of a feed charge. such as natural gas. are: 1500° to 1700° F./350 to 400 psig. Under these conditions the primary reformate will be discharged from furnace 30 at a temperature of about 1400° F and will contain about 16-17% of unconverted methane.

Compressed air enriched with oxygen is supplied to reformer 40 by line 34 and is mixed with the fresh hydrocarbon charge from line 22 forming a combustion mixture burned in the upper portion of furnace 40 and supplying heat for initiating the secondary reforming operation. The amount of oxygen-enriched air supplied oo furnace 40 and its proportional content of free oxygen are in predetermined quantities designed to supply sufficient oxygen for conversion of the hydrocarbons supplied through lines 33 and 22 and to provide an amount of nitrogen (from the air supplied) to obtain as secondary reformate a syngas mixture containing hydrogen and nitrogen in about the desired ratio (3:1) for conversion to ammonia ($NH_3$), including the hydrogen later obtained by shift conversion of CO in reacting with steam to form $CO_2$ and $H_2$.

The natural gas feed to the secondary reformer and the percent oxygen enrichment is controlled to obtain an outlet temperature at the products discharge end of reformer 40 in the range 1650° to 1750° F. preferably at about 1700° F.±20° F., at which temperature primary/-secondary reformer operation is optimized.

The secondary reformer effluent discharged from 40 via line 45 will contain principally hydrogen and nitrogen accompanied by less than about 25% of total minor impurities. As illustrated in FIG. 1, the discharged secondary reformate is cooled by indirect heat exchange at 46 with the generation of high pressure steam. and at 14 in preheating natural gas; then at a temperature of about 700° F. it is subjected to high temperature shift reaction at 47 (HTS). The product leaving reactor 47 is further cooled to about 400° F. and introduced via line 49 into low temperature shift reactor 50, from which it is discharged at about 440° F. The product discharged from 50 via line 51 will have a typical composition: (mol%) 0.83 $CH_4$, 19.15 $CO_2$, 0.33 CO, 57.8, $H_2$ and 21.88 $N_2$ (dry basis).

After further cooling by heat exchange with various process streams, as illustrated in the FIG. 1 flow sheet at 52, 53. 54, the product in line 51 is subjected to phase separation at 55, with the liquid condensate being withdrawn via line 57 and the gaseous overhead products being sent via line 59 to a pressure swing adsorption system 60 for removal of contained $CO_2$ and further purification to obtain a relatively pure syngas product having a $H_2/N_2$ mole ratio of about 3:1.

Pressure swing adsorption (PSA) systems which are effective in the selective removal of $CO_2$ from a hydrogen-rich gas mixture. such as shift converter effluent gas from a hydrocarbon reforming operation, are well known in the art. In typical operation of certain of such PSA systems a stream of relatively pure hydrogen is obtained as the primary product and a stream of pure $CO_2$ as the secondary product. The primary hydrogen product stream, however, will contain small amounts of residual impurities. such as $CH_4$ and CO, which need to be removed if a substantially pure primary product is required. Such removal of minor impurities may be effected by pressures swing adsopton or other separation techniques.

The shift conversion product in line 59. according to the present invention, will comprse chiefly hydrogen, nitrogen and $CO_2$, accompanied by a reactively small quantity (less than about 3%) of minor impurities such as methane. CO. Ar and steam. Practically all of the $CO_2$ and steam are removed by selective adsorption in an adsorbent bed of activated carbon, with recovery of a $H_2/N_2$ stream containing these minor impurities. Selective removal of most of these minor impurities is obtained by-passing the obtained $CO_2$-free $H_2/N_2$ stream through a second adsorbent bed for removal of most of these minor impurities therefrom.

While the $CO_2$ removal step and the further purification of the resulting $H_2/N_2$ stream may be carried out in separate PSA systems. it is preferred to employ and integrated PSA system having one section comprised of a group of adsorption columns effective for selective adsorption of $CO_2$ in gas flow communication with a second sectio comprised of a group of adsorption columns effective for removal of at least most of the remaining minor impurities. A preferred arrangement of a PSA system that can be utilized in practice of the invention is illustrated in FIG. 2 (the valves controlling stream movement being omitted).

Figure 2:
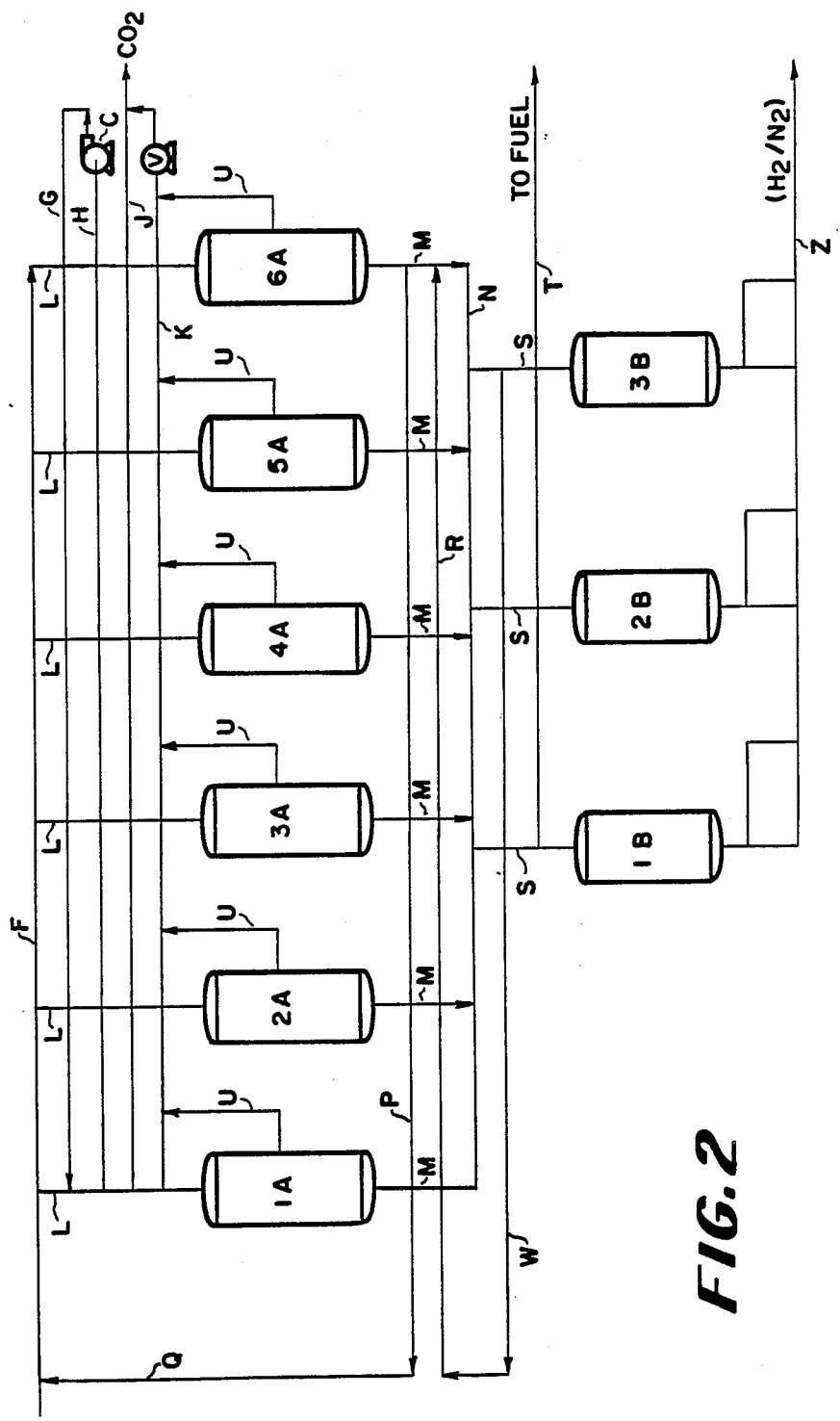
FIG. 2 is a flow diagram of a preferred PSA unit for removal of $CO_2$ and further purification of the syngas subsequently charged for conversion to $NH_3$.

As shown in FIG. 2. the preferred PSA system comprises a group of six columns labeled 1A through 6A operating sequentially in parallel and a group of three oolumns labeled 1B through 3B also operated sequentially in parallel. The columns of the A group each contains an adsorbent bed selective in adsorptive removal of $CO_2$ from a mixed gas stream; each of the columns of the B group contains an adsorbent bed for adsorptive removal of minor impurities from the unadsorbed gas effluent received from a column of the A group during the adsorption step of the operating cycle. At the termination of the adsorption step flow of gas from the A column to the B column is discontinued and these columns are separately subjected to regeneration of the contained impurity-laden adsorbent by a sequence of steps hereinafter described.

In the illustraed system flow of gas streams into and out of the adsorption columns of each group is had through a series of manifolds labeled F, G, H, J, K, P, R, N, T and Z. The individual columns being operatively connected to these manifolds through valve controlled connecting lines L. M and S.

The feed gas mixture from line 59 is delivered to a selected initial column of the A group from manifold F by opening the appropriate control valve in the branch line L connecting to that column. During the adsorption step the feed gas mixture flows via Line L into the selected column then on the adsorption stroke and is discharged via connecting line M into manifold N and connecting line S into the selected column of the B group. During the described gas flow $CO_2$ is adsorbed in the A column and at least most of the minor impurities are adsorbed in the B column, with the discharge at the exit end of the B column of an unsorbed primary $N_2/H_2$ product stream which may yet contain trace amounts of CO and Ar.

Each of the A columns in turn during an operating cycle goes through the following operating sequence:

(1) Adsorption—The A bed and the connected B bed having been previously brought to designed superatmospheric adsorption pressure, the gas mixture to be separated is passed in series through the adsorbent beds in these columns for a preset time period short of breakthrough of $CO_2$ from the exit end of the A column. The unsorbed gas discharged from the A column passes through the connected B column, at the exit end of which the $H_2/N_2$ product stream is discharged into manifold Z.

(2) High Pressure Rinse—At the termination of the adsorption step a stream of essentially pure $CO_2$ from manifold G is next passed through the $CO_2$ laden A column at the prevailing superatmospheric pressure, discharging at the exit end of tha column into manifold P. During this step all of the void gas and coadsorbed less selectively adsorbed species is purged out of the A column and is recycled via line P and connecting line Q into feed-manifold F and thereby into a companion A column then on the adsorption stroke. During this step the communicating valve between the A and B columns is closed.

(3) Desorption (I)—The rinsed A column is next depressured to an intermediate pressure level by gas withdrawal (countercurrent to initial feed direction) through line L and manifold H. The withdrawn gas, desorbed essentially pure $CO_2$. is recompressed at C and used as the rinse gas in a companion A column then undergoing step 2.

(4) Desorption (II)—The A column is next depressurized to ambient pressure level by further gas withdrawal (counter to feed direction). The withdrawn gas (essentially pure $CO_2$) is discharged into manifold J from which it may be collected as a secondary useful product.

(5) Evacuation—The A column is next evacuated to designed subatmospheric pressure level (30 to 300 Torr). The evacuated gas, comprised of high purity $CO_2$. discharges via line L into manifold K through vacuum pump V into manifold J. Alternatively. evacuated gas discharges at a midpoint in the A beds through lines U and K.

(6) Pressure Equalization—The evacuated A column is brought back to an intermediate pressure level by transfer therein of gas withdrawn from a B column then undergoing step (b). The transferred gas stream comprises chiefly void gas which may include some of the gas component desorbed from the B bed. The path of gas flow is through line S into manifold W and then into and through manifold R into the A column via line M.

(7) Pressurization—The A column is next brought to feed pressure level by introduction of primary product from manifold Z. At this point the A column is ready to undergo a new cycle starting with step 1. The path of gas flow is through a B column, manifold S and into manifold W, discharging into the A column via manifold R and line M.

In the preferred arrangement as illustrated in FIG. 2, each of the B beds goes through a complete operating cycle in half the time required for a complete A bed cycle.

Assuming an arbitrarily chosen 24 minute cycle for example, devoted to A bed operation, the adsorption stroke will occupy 4 minutes in the A column as well as 4 minutes in the B column connected in series thereto. During the next 8 minutes the B column is fully regenerated and repressurized to begin a new cycle, undergoing the following steps in sequence:

(a) Pressure Equalization—During half the time that the disconnected A column is being subjected to the high pressure rinse (step 2), the impurity laden B column is connected by appropriate valve opening for gas transfer therefrom into a different A column then on its pressure equalization (step 6). Gas flow out of the B column during this step is countercurrent to that of initial feed direction.

(b) Desorption—Following the pressure equalization step countercurrent withdrawal of gas from the B column is continued to near ambient level. The effluent, comprised of dilute impurities of the initial feed mixture as well as part of the hydrogen and nitrogen. is recycled via manifold T (line 61, FIG. 1) for use as fuel in he primary steam reformer.

(c) Low Pressure Rinse—While the A column is undergoing step 3 of the cycle, the B column at the existing ambient pressure is rinsed with a part of the high purity primary product from manifold Z. The rinse effluent is also recycled via manifold T for use as fuel in the primary steam reformer.

(d) Pressurization—Following the rinse operation therein, the B column is bought back to initial superatmospheric adsorption pressure level by countercurrent introduction of primary product gas from manifold Z. At this point the B column is connected to one of the A columns that has undergone step 6 so that the repressuring gas flows from the B column into the connected A column until both columns are at the initial adsorption pressure level, for repetition of their respective operating cycles.

Table 1 below sets out the performance of the individual A and B columns during an arbitrarily chosen 24 minute cycle. It is apparent that other cycle times can be chosen and other distributions of time devoted to the individual steps can be used.

TABLE 1

| Time (Min) | 1A | 2A | 3A | 4A | 5A | 6A | 1B | 2B | 3B |
|---|---|---|---|---|---|---|---|---|---|
| 0-1 | A | PE | E | D₂ | D₁ | R | A | P | PE |
| 1-2 | A | PE | E | D₂ | D₁ | R | A | P | PE |
| 2-3 | A |   | E | D₂ | D₁ | R | A | PR | D |
| 3-4 | A | PR | E | D₂ | D₁ | R | A | PR | D |
| 4-5 | R | A | PE | E | D₂ | D₁ | PE | A | P |
| 5-6 | R | A | PE | E | D₂ | D₁ | PE | A | P |
| 6-7 | R | A |   | E | D₂ | D₁ | D | A | PR |
| 7-8 | R | A | PR | E | D₂ | D₁ | D | A | PR |
| 8-9 | D₁ | R | A | PE | F | D₂ | P | PE | A |
| 9-10 | D₁ | R | A | PE | E | D₂ | P | PE | A |
| 10-11 | D₁ | R | A |   | E | D₂ | PR | D | A |
| 11-12 | D₁ | R | A | PR | E | D₂ | PR | D | A |
| 12-13 | D₂ | D₁ | R | A | PE | E | A | P | PE |
| 13-14 | D₂ | D₁ | R | A | PE | E | A | P | PE |
| 14-15 | D₂ | D₁ | R | A |   | E | A | PR | D |
| 15-16 | D₂ | D₁ | R | A | PR | E | A | PR | D |
| 16-17 | E | D₂ | D₁ | R | A | PE | PE | A | P |
| 17-18 | E | D₂ | D₁ | R | A | PE | PE | A | P |
| 18-19 | E | D₂ | D₁ | R | A |   | D | A | PR |
| 19-20 | E | D₂ | D₁ | R | A | PR | D | A | PR |
| 20-21 | PE | E | D₂ | D₁ | R | A | P | PE | A |
| 21-22 | PE | E | D₂ | D₁ | R | A | P | PE | A |
| 22-23 |   | E | D₂ | D₁ | R | A | PR | D | A |
| 23-24 | PR | E | D₂ | D₁ | R | A | PR | D | A |

A Adsorption
R High Pressure Rinse
D₁ Desorption
D₂ Desorption
E Evacuation
PE Pressure Equalization
P Purging
PR Repressuring Any sorbent which is selective in the adsorption of $CO_2$ from a shift converted effluent hydrocarbon reforming plant may be employed in the A columns. preferably an activated carbon or a molecular sieve zeolite. For the B column beds a combination of adsorbents is preferred such as a mixture or separate layers of activated carbon and A and X molecular sieve zeolites.

Instead of using part of the high purity $H_2/N_2$ product recovered in manifold Z for rinsing the B column (step C), one may alternatively employ as rinse gas nitrogen from an external source, if conveniently available. This alternative permits reduction of the size of the B column as well as provides an increase in recovery of $H_2$. Moreover. more stringent cleaning of the B column can be practiced thereby with accompanying reduction of the void $H_2$ losses.

PSA systems that may be used in practice of the invention are disclosed in above-cited U.S. Pat. No. 4,171,206, pertinent portions of which are hereby incorporated herein by reference.

As seen from Table 2 below, by practice of the invention with 55% or more of the natural gas feed being charged to secondary reforming and using oxygen enriched air (30 to 35% $O_2$) in the secondary reformer, a 9.5 to 10% improvement in efficiency is obtained as compared to a base case using ambient air in amounts sufficient to obtain the same production of hydrogen and nitrogen. Other runs (Case II to IX) made at a 50/50 split of the natural gas charged to primary and secondary reforming respectively, employing oxygen-enriched air having a total free oxygen content at various levels from 22.5% to over 39% were in each instance less efficient than the runs made at the conditions advocated for practice of the invention (runs XII to XIV), including a split of fresh hydrocarbon feed so that 55% or more is charged directly to the secondary reforming operation and wherein enriched air of 30-35% $O_2$ content is supplied to the secondary reforming operation. It will be noted from Table 2, comparing the total natural gas required for the production of given amount of syngas ($H_2+N_2$), that even with the use of enriched air in the 35-35% $O_2$ range (31.11%) and charging 50% or more of the fresh feed to the primary steams reforming operation (runs VI, X and XII) significantly poorer results are obtained than that had in runs (XII, XIII, XIV) made at the conditions advocated for practice of the invention. Above about 65% fresh feed being charged to the secondary reforming operation, the full advantage of the present invention are curtailed.

TABLE 2

|  | Base (Amb. air) | Case I | Case II | Case III | Case IV | Case V | Case VI | Case VII |
|---|---|---|---|---|---|---|---|---|
|  |  | 22.5% | 24.4% | 25.3% | 26.3% | 26.2% | 31.11 | 34.04 |
| MMBTU/hr duty, | 866.79 | 885.69 | 907.12 | 918.05 | 907.95 | 911.71 | 992.95 | 996.13 |
| MMBTU/hr outlet, °F. | 198.18 1500 | 178.83 1450 | 159.51 1400 | 149.88 1375 | 159.66 1400 | 160.32 1400 | 87.33 1400 | 87.62 1400 |
| % CH₄ Prium. | 10.45 | 13.41 | 16.8 | 18.6 | 16.8 | 16.77 | 16.77 | 16.77 |
| Sec. outlet, °F. | 1862 | 1811 | 1780 | 1788 | 1825 | 1870 | 1695 | 1855 |
| % CH₄ Sec. | 0.2528 | 0.3862 | 0.4855 | 0.542 | 0.542 | 0.1904 | 0.874 | 0.1557 |

TABLE 2-continued

| Heat Recovery | | | | | | | |
|---|---|---|---|---|---|---|---|
| Process Boiler, MMBTU/hr | 167.8 | 16.29 | 161.6 | 160.95 | 169.52 | 178.14 | 160.90 | 192.30 |
| Boiler, MMBTU/hr | 89.3 | 68.3 | 49.02 | 40.29 | 49.77 | 50.26 | 15.2 | 17.04 |
| Preheat MMBTU/hr | 82.14 | 96.35 | 91.57 | 94.24 | 93.31 | 95.52 | 112.86 | 119.87 |
| Cooler MMBTU/hr | 39.57 | 39.75 | 39.96 | 40.06 | 39.97 | 40.01 | 40.78 | 40.83 |
| Stack MMBTU/hr | 81.98 | 76.25 | 70.93 | 68.41 | 71.25 | 71.67 | 56.78 | 57.84 |
| N.G. Fuel MMBTU/hr | 297.93 | 251.47 | 208.43 | 187.57 | 217.38 | 224.01 | 85.40 | 119.90 |
| Product | | | | | | | | |
| $H_2$ Moles hr | 7350 | 7350 | 7350 | 7350 | 7350 | 7350 | 7350 | 7350 |
| $N_2$ Moles hr | 2450 | 2450 | 2450 | 2450 | 2450 | 2450 | 2450 | 2450 |
| Total N.G. MMBTU/hr | 1164.72 | 1137.16 | 1115.55 | 1105.62 | 1125.33 | 1135.72 | 1078.35 | 1116.03 |
| Total WHR MMBTU/hr | 339.24 | 317.55 | 302.19 | 295.48 | 312.60 | 323.92 | 288.96 | 329.21 |
| Δ Overall MMBTU/hr | | 5.87 | 12.12 | 15.34 | 12.75 | 13.68 | 36.09 | 38.66 |
| Δ N.G. MMBTU/hr | | 27.56 | 49.17 | 59.10 | 39.39 | 29.00 | 86.37 | 48.69 |

| | Case VIII | Case IX | Case X | Case XI | Case XII | Case XIII | Case IX |
|---|---|---|---|---|---|---|---|
| MMBTU/hr | 36.73 | 39.2 | 31.11 | 31.11 | 31.11 | 31.11 | 32.6 |
| duty, MMBTU/hr | 1025.42 | 1058.89 | 959.18 | 970.93 | 980.10 | 975.23 | 988.2 |
| outlet, °F. | 90.20 | 93.16 | 126.53 | 85.39 | 77.58 | 70.03 | 69.53 |
| | 1400 | 1400 | 1400 | 1400 | 1400 | 1400 | 1400 |
| % $CH_4$ Prium. | 16.77 | 16.77 | 16.77 | 16.77 | 16.77 | 16.77 | 16.77 |
| Sec. outlet, °F. | 2007 | 2148 | 1941.68 | 1780 | 1735 | 1690 | 1773 |
| % $CH_4$ Sec. | 0.035 | 0.01 | 0.102 | 0.373 | 0.5842 | .942 | 0.373 |
| Heat Recovery | | | | | | | |
| Process Boiler, MMBTU/hr | 227.63 | 263.76 | 195.80 | 173.2 | 166.42 | 160.2 | 175.17 |
| Boiler, MMBTU/hr | 17.71 | 18.22 | 34.77 | 16.28 | 12.01 | 7.56 | 8.9 |
| Preheat MMBTU/hr | 130.53 | 141.64 | 110.21 | 110.57 | 111.43 | 113.17 | 115.43 |
| Cooler MMBTU/hr | 41.11 | 41.43 | 40.47 | 40.58 | 40.66 | 40.80 | 40.74 |
| Stack MMBTU/hr | 59.40 | 61.03 | 65.64 | 56.37 | 54.59 | 52.89 | 53.27 |
| N.G. Fuel MMBTU/hr | 131.7 | 139.92 | 179.94 | 104.60 | 83.06 | 56.31 | 81.06 |
| Product | | | | | | | |
| $H_2$ Moles hr | 7350 | 7350 | 7350 | 7350 | 7350 | 7350 | 7350 |
| $N_2$ Moles hr | 2450 | 2450 | 2450 | 2450 | 2450 | 2450 | 2450 |
| Total N.G. MMBTU/hr | 1157.12 | 1198.81 | 1139.12 | 1075.53 | 1063.16 | 1051.54 | 1069.26 |
| Total WHR MMBTU/hr | 375.87 | 423.62 | 340.78 | 300.05 | 289.86 | 280.93 | 299.5 |
| Δ Overall MMBTU/hr | 44.23 | 50.29 | 27.14 | 50.00 | 52.18 | 54.87 | 55.72 |
| Δ N.G. MMBTU/hr | 7.60 | 34.09 | 25.6 | 89.19 | 101.56 | 113.18 | 95.46 |

In addition to the advantages realized, resulting from the indicated introduction of a major portion of the fresh hydrocarbon feed into the secondary reformer and carrying out the secondary reforming with oxygen-enriched air, the proposed use of pressure swing adsorption instead of the more conventional removal of $CO_2$ by solvent extraction, enables economic recovery of valuable high purity $CO_2$ which can be used for production of urea, methanol or other desire products. It should be noted further that under the proposed conditions for practice of the invention the primary reformer can be designed to operate at lower outlet temperature and lower steam/carbon ratio thereby reducing capital costs for the primary reformer furnace. as well as attain improved plant efficiency because of the lower reformer firing duty and lower steam to carbon ratio.

By replacing the conventional syngas purification technique involving $CO_2$ removal by solvent extraction and methanation of residual carbon oxides, by the herein described PSA system, a larger slip of $CH_4$ and CO is permitted in the gas stream discharged from the secondary reformer, since these components can be largely or almost entirely removed by the advocated PSA system. Because of the high purity of the stream ($H_2+N_2$) discharged from the PSA unit and charged to the $NH_3$ synthesis unit one can design and operate the $NH_3$ synthesis loop at much lower pressure, with accompanying further savings in power requirements and equipment costs.

What is claimed:

1. In the production and recovery of ammonia synthesis gas, the method which comprises: providing a hydrocarbon vapor stream rich in methane and substantially free of sulfur compounds;
   (b) dividing said stream into a minor portion comprising less than 45% by volume of said stream and a major portion;
   (c) subjecting said minor portion to catalytic steam reforming at elevated temperature and pressure, thereby producing a primary reformate;
   (d) subjecting said major portion to oxidative reforming in admixture with the obtained primary reformate by catalytic reaction with an oxygen-enriched air stream containing 30-35% oxygen by volume, thereby producing a secondary reformate comprised principally of hydrogen, nitrogen and carbon oxides and containing a minor amount of contaminants including methane and argon; the hydrogen content of said secondary reformate being less than that providing a 3:1 mol ratio of hydrogen to nitrogen in said secondary reformate;
   (e) subjecting said secondary reformate to a water gas shift reaction whereby contained carbon monoxide is converted to carbon dioxide and thereby also producing a further quantity of hydrogen, such that the $H_2/N_2$ mol ratio in the shift reaction product is approximately 3:1;
   (f) removing carbon dioxide from the shift reacted secondary reformate by passing the same at superatmospheric pressure through a first bed of solid particulate adsorbent selective in retention of carbon dioxide, thereby producing a hydrogen-rich product effluent freed of carbonddioxide;
   (g) passing said hydrogen-rich effluent into and through a second bed of solid particulate adsorbent selective in retention of carbon monoxide and methane as opposed to hydrogen and nitrogen and recovering from said second bed a mixture of hydrogen and nitrogen in approximately 3:1 molar ratio and containing less than 25% of impurities on a dry basis.

2. The method as defined in claim 1 wherein said hydrocarbon vapor stream is desulfurized natural gas.

3. The method as defined in claim 2 wherein said minor portion subjected to steam reforming constitutes at least about 35 volume percent of said hydrocarbon vapor stream.

4. The method as defined in claim 2 wherein said minor portion subjected to steam reforming constitutes about 40 volume percent of said hydrocarbon vapor stream.

5. The mehod as defined in claim 2 wherein said catalytic steam reforming is carried out under operating conditions such that the primary reformate contains 15 to 20% by volume of unreacted methane.

6. The method as defined in claim 5 wherein said primary reformate contains about 17% by volume of unreacted methane.

7. The method as defined in claim 1 wherein the quantity of oxygen enriched air and unreacted methane in the gas adm!xture subjected to oxdative reforming is balanced with respect to the nitrogen content of said enriched air so as to produce a secondary reformate heaving a total hydrogen content, after water gas shift reaction, approximately in the ratio of 3 mols hydrogen per mol of nitrogen.

8. The method as defined in claim 1 wherein the mol percent oxygen in said enriched air stream is controlled with respect to the total methane content in the admixed feed charged to oxidative reforming so as to maintain an exit temperature of secondary reformate of 1680° to 1720° F.

9. The method as defined in claim 1 wherein said fist and second beds of adsorbent are provided in groups of columns of an integrated pressure swing adsorption system and wherein individual columns of the first group are arranged for controlled fluid flow communication with individual columns of the second group.

10. The method as defined in claim 9 wherein said adsorption system is arranged to provide a group of six columns, each containing a first bed of solid adsorbent and a group of three cllumns each containing a second bed of solid adsorbent.

11. The method as defined in claim 10 wherein retained carbon dioxide is desorbed from said first adsorbent bed by gas withdrawal from said bed to about ambient pressure level followed by evacuation.

12. The method as defined in claim 11 wherein part of said desorbed carbon dioxide is employed in rinsing a carbon dioxide laden bed at superatmospheric pressure prior to desorption. at least part of the remainder being recovered as product comprising over 98% $CO_2$ 13. The method as defined in claim 10 wherein impurities including carbon monoxide and methane retained in a second adsorbent bed are removed therefrom by purging said bed with nitrogen-containing gas.

14. The method as defined in claim 2 wherein the mixture of hydrogen and nitrogen recovered from said second bed is compressed to a level of 1100–1200 psig and charged to a catalytic reaction fo production of ammonia.

* * * * *